(12) United States Patent
Fujikura et al.

(10) Patent No.: US 11,904,781 B2
(45) Date of Patent: Feb. 20, 2024

(54) WIRE HARNESS WITH BODY PROTRUSION

(71) Applicant: SUMITOMO WIRING SYSTEMS, LIMITED, Yokkaichi (JP)

(72) Inventors: Masaya Fujikura, Yokkaichi (JP); Takao Suga, Yokkaichi (JP)

(73) Assignee: SUMITOMO WIRING SYSTEMS, LIMITED, Mie (JP)

( * ) Notice: Subject to any disclaimer, the term of this patent is extended or adjusted under 35 U.S.C. 154(b) by 325 days.

(21) Appl. No.: 17/441,129

(22) PCT Filed: Sep. 24, 2019

(86) PCT No.: PCT/JP2019/037173
§ 371 (c)(1),
(2) Date: Sep. 20, 2021

(87) PCT Pub. No.: WO2020/194797
PCT Pub. Date: Oct. 1, 2020

(65) Prior Publication Data
US 2022/0161743 A1 May 26, 2022

(30) Foreign Application Priority Data

Mar. 27, 2019 (JP) ................................ 2019-060730

(51) Int. Cl.
| | | |
|---|---|---|
| *B60R 16/02* | (2006.01) | |
| *H02G 3/04* | (2006.01) | |
| *H02G 3/32* | (2006.01) | |

(52) U.S. Cl.
CPC ....... *B60R 16/0215* (2013.01); *H02G 3/0462* (2013.01); *H02G 3/32* (2013.01)

(58) Field of Classification Search
None
See application file for complete search history.

(56) References Cited

U.S. PATENT DOCUMENTS 4,597,690 A * 7/1986 Girard ..................... F16B 7/04
403/312
6,386,786 B1 * 5/2002 Perlman .................. F16L 3/085
403/374.2
(Continued)

FOREIGN PATENT DOCUMENTS

CN 1031881 A * 3/1989 ........... E04B 1/1906
CN 103392279 A * 11/2013 ............... H02G 1/00
(Continued)

OTHER PUBLICATIONS

JP-2012038553_Translation. Feb. 23, 2012. Hiraishi T (Year: 2012).*
(Continued)

*Primary Examiner* — Timothy J. Dole
*Assistant Examiner* — Muhammed Azam
(74) *Attorney, Agent, or Firm* — Oliff PLC (57) ABSTRACT

A wire harness that includes an electric wire and a first tube in which the electric wire is housed a clamp that holds the first tube. The clamp includes a main body in which the first tube is housed, and a protrusion that protrudes from the main body in a longitudinal direction of the first tube. The first tube is fastened to the protrusion with a fastener, and the protrusion has an inner circumferential surface opposed to the first tube, a first end located on one side of the inner circumferential surface in a circumferential direction, and a second end located on the other side of the inner circumferential surface in the circumferential direction. A height of the inner circumferential surface in a vertical direction continuously decreases from the first end to the second end in a state in which the wire harness is installed in the vehicle.

3 Claims, 7 Drawing Sheets

(56) References Cited

U.S. PATENT DOCUMENTS

| | | | |
|---|---|---|---|
| 8,530,743 B2 * | 9/2013 | Mori | B60R 16/0215 174/91 |
| 10,439,376 B2 | 10/2019 | Sugino | |
| 2006/0172617 A1 * | 8/2006 | Kobayashi | H01R 13/113 439/843 |
| 2006/0172621 A1 * | 8/2006 | Noro | H01R 13/115 439/852 |
| 2015/0083462 A1 | 3/2015 | Yoshida et al. | |
| 2019/0199008 A1 * | 6/2019 | Kanemura | H01R 13/6582 |
| 2019/0386472 A1 | 12/2019 | Sugino | |
| 2020/0169067 A1 * | 5/2020 | Takahashi | H02G 3/14 |

FOREIGN PATENT DOCUMENTS

| | | | | |
|---|---|---|---|---|
| CN | 104302518 A | * | 1/2015 | B60R 16/0215 |
| CN | 107448683 A | * | 12/2017 | F02M 35/00 |
| CN | 102934305 B | * | 5/2018 | B60R 16/0215 |
| CN | 108140454 A | * | 6/2018 | B60R 16/0215 |
| CN | 108202678 A | * | 6/2018 | B60R 16/0215 |
| DE | 202009005647 U1 | * | 7/2009 | F16G 13/16 |
| DE | 102009033103 A1 | * | 2/2011 | B60R 16/0215 |
| EP | 0195852 A2 | * | 1/1986 | |
| FR | 2551594 A1 | * | 3/1985 | |
| FR | 2594187 A1 | * | 2/1987 | |
| FR | 3002601 A1 | * | 8/2014 | F16L 3/1016 |
| JP | H02-034888 U | | 3/1990 | |
| JP | 2012-235555 A | | 11/2012 | |
| JP | 2013-252024 A | | 12/2013 | |
| JP | 2018-101462 A | | 6/2018 | |
| KR | 20070023109 A | * | 2/2007 | |
| KR | 20100005354 U | * | 5/2010 | |
| KR | 20100009322 U | * | 9/2010 | |
| NL | 8201602 A | * | 11/1983 | F16B 2/06 |
| NL | 1029102 C2 | * | 11/2006 | F16L 3/222 |
| WO | WO-8001506 A1 | * | 7/1980 | |
| WO | WO-2011108141 A1 | * | 9/2011 | B60K 1/00 |
| WO | WO-2013050064 A1 | * | 4/2013 | H02G 3/32 |
| WO | WO-2013134868 A1 | * | 9/2013 | E21B 17/04 |
| WO | WO-2018016336 A1 | * | 1/2018 | F16L 11/11 |
| WO | WO-2020194798 A1 | * | 10/2020 | B60R 16/0215 |

OTHER PUBLICATIONS

JP-2017130371-A_Translation. Jul. 27, 2017. Yoshizawa H (Year: 2017).*

JP-2005259363-A_Translation. Sep. 22, 2005. Mase T (Year: 2005).*

JP-H10134875-A_Translation. May 22, 1998. Furuya (Year: 1998).*

Dec. 24, 2019 International Search Report issued in International Patent Application No. PCT/JP2019/037173.

* cited by examiner

WIRE HARNESS WITH BODY PROTRUSION

BACKGROUND

The present disclosure relates to a wire harness.

JP 2018-101462A discloses a wire harness provided with a clamp that is to be fixed to a vehicle body while holding a tubular member such as a metal pipe inside which an electric wire is housed.

SUMMARY

If a clamp for holding a tubular member is not provided with a structure for discharging a liquid such as water, when a liquid such as water accumulates in the clamp, the tubular member is exposed to the liquid for a long period of time, and thus there is a concern that a metal pipe or the like used as the tubular member will be corroded, for example.

An exemplary aspect of the disclosure provides a wire harness in which accumulation of a liquid in a clamp for holding a tubular member can be suppressed.

A wire harness of the present disclosure is a wire harness that is to be installed in a vehicle and includes: an electric wire; a first tube in which the electric wire is housed; and a clamp that holds the first tube, wherein: the clamp includes a main body in which the first tube is housed, and a protrusion that protrudes from the main body in a longitudinal direction of the first tube, the first tube being fastened to the protrusion with a fastener, and the protrusion has an inner circumferential surface opposed to the first tube, a first end located on one side of the inner circumferential surface in a circumferential direction, and a second end located on the other side of the inner circumferential surface in the circumferential direction, a height of the inner circumferential surface in a vertical direction continuously decreasing from the first end to the second end in a state in which the wire harness is installed in the vehicle.

With the present disclosure, it is possible to provide a wire harness in which accumulation of a liquid in a clamp for holding a tube can be suppressed.

DETAILED DESCRIPTION OF EMBODIMENTS

Description of Embodiments of the Present Disclosure

First, embodiments of the present disclosure will be listed and described.

A wire harness of the present disclosure is

[1] a wire harness to be installed in a vehicle, the wire harness including: an electric wire; a tubular member in which the electric wire is housed; and a clamp that holds the tubular member, wherein the clamp includes a main body in which the tubular member is housed, and a protruding portion that protrudes from the main body in a longitudinal direction of the tubular member, the tubular member being fastened to the protruding portion with a fastening member, and the protruding portion has an inner circumferential surface opposed to the tubular member, a first end portion located on one side of the inner circumferential surface in a circumferential direction, and a second end portion located on the other side of the inner circumferential surface in the circumferential direction, a height of the inner circumferential surface in a vertical direction continuously decreasing from the first end portion to the second end portion in a state in which the wire harness is installed in the vehicle.

Due to the configuration in which the height in the vertical direction of the inner circumferential surface of the protruding portion of the clamp for holding the tubular member continuously decreases from the first end portion to the second end portion in the circumferential direction in the state in which the wire harness is installed in the vehicle, accumulation of a liquid beginning to accumulate in the clamp, mainly in the protruding portion, can be suppressed.

[2] It is preferable that the main body includes a tubular portion in which the tubular member is housed, and a base portion that is adjacent to the tubular portion, and the tubular portion is provided with a through hole through which the inside and the outside of the tubular portion are in communication with each other. Discharge of a liquid beginning to accumulate in the clamp and ventilation can occur through the through hole provided in the tubular portion.

[3] It is preferable that the tubular portion is provided with a plurality of the through holes. The likelihood of a liquid beginning to accumulate in the clamp being discharged is increased by providing a plurality of through holes in the tubular portion. Moreover, with such a configuration, the plurality of through holes can also function in pairs to allow ventilation while the liquid is being discharged therethrough, thus making it possible to promote the discharge of the liquid.

[4] It is preferable that the tubular portion includes a housing portion provided with an opening portion through which the tubular member is introduced, a lid portion for covering the opening portion, and a stabilizer portion for biasing the tubular member toward the lid portion, and the stabilizer portion is provided by forming the through hole in a U-shape. The U-shaped through hole for forming the stabilizer portion can also function as a discharge hole for discharging a liquid beginning to accumulate in the clamp or a vent hole.

[5] It is preferable that the inner circumferential surface includes an intermediate position opposed to the lowermost portion of the tubular member between the first end portion and the second end portion, and further includes a discharge promoting surface whose height in the vertical direction continuously decreases from the intermediate position to the second end portion, in a state in which the wire harness is installed in the vehicle. A liquid on the inner circumferential surface can be more reliably discharged due to the discharge promoting surface.

Details of Embodiments of the Present Disclosure

The following describes specific embodiments of a wire harness of the present disclosure with reference to the drawings. In the present disclosure, the term "main component" encompasses a meaning that other components are contained as long as the functions of the main component are not inhibited as well as a meaning that the content of the main component is 50 mass % or more, unless otherwise stated. That is, various additives such as a thermal stabilizer, an antioxidant, an ultraviolet absorber, a light stabilizer, a crystal nucleating agent, a coloring agent, an antistatic agent, an antihydrolysis agent, a lubricant, a flame retardant, and an elastomer may be contained as appropriate as long as the functions of the main component are not inhibited. Moreover, another resin composition may be contained as long as the functions of the main component are not inhibited. It should be noted that the present disclosure is not limited to these embodiments and is defined by the scope of the appended claims, and all changes that fall within the same essential spirit as the scope of the claims are intended to be included therein. A portion of the configuration may be exaggerated or simplified for illustrative reasons in the diagrams. In addition, the ratios between the dimensions of portions shown in the diagrams may be different from the actual ratios.

Figure 1:
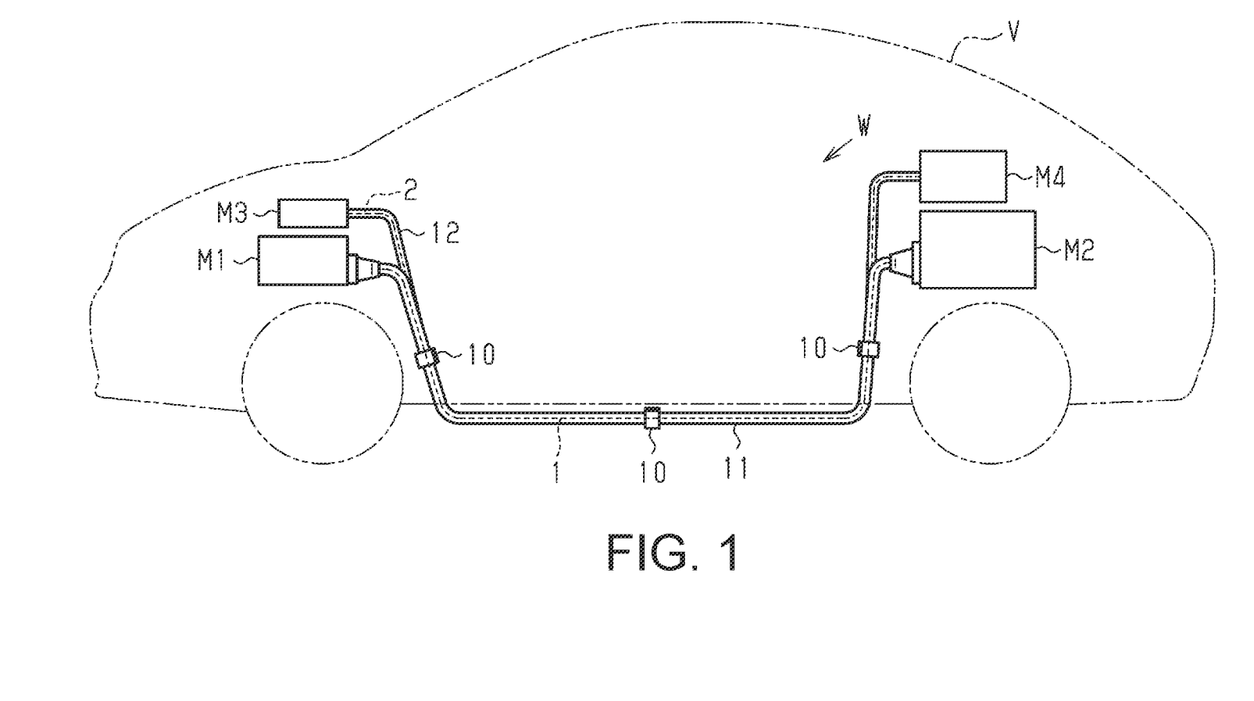
FIG. 1 is a schematic configuration diagram illustrating a typical exemplary configuration of a wire harness according to an embodiment.

A wire harness W shown in FIG. 1 is installed in a vehicle V such as a hybrid car or an electric car. The wire harness W includes a high-voltage electric wire 1 included in a high-voltage circuit, and a low-voltage electric wire 2 included in a low-voltage circuit. The high-voltage electric wire 1 electrically connects a device M1 such as an inverter that is installed in the front portion of the vehicle V and a device M2 such as a high-voltage battery that is installed in the rear portion of the vehicle V. The inverter is connected to a wheel driving motor that serves as a power source for vehicle travel, generates AC power from the high-voltage battery, and supplies the AC power to the motor. The high-voltage battery can supply a voltage of several hundred volts, for example. The low-voltage electric wire 2 electrically connects a device M3 such as a fuse box that is installed in the front portion of the vehicle V and a device M4 such as a low-voltage battery that is installed in the rear portion of the vehicle V. The low-voltage battery can supply a voltage of 12 volts, for example. The wire harness W is routed passing under the floor of the vehicle V, etc., for example.

The electric wires 1 and 2 are formed in an elongated shape and extend in the front-rear direction of the vehicle V, for example. A high voltage/a large amount of electric current can be applied to the high-voltage electric wire 1. The electric wires 1 and 2 each include a core wire obtained by twisting a plurality of metal strands, and an insulating coating that covers the core wire, for example. The electric wires 1 and 2 may each be a shielded electric wire having an electromagnetic shield structure for shielding an electromagnetic wave, or a non-shielded electric wire having no shield structure. One end portion of the high-voltage electric wire 1 is connected to the device M1 via a connector, and the other end portion of the high-voltage electric wire 1 is connected to the device M2 via a connector. One end portion of the low-voltage electric wire 2 is connected to the device M3 via a terminal fitting, and the other end portion of the low-voltage electric wire 2 is connected to the device M4 via a terminal fitting. The high-voltage electric wire 1 and the low-voltage electric wire 2 each correspond to an example of an electric wire.

Figure 2:
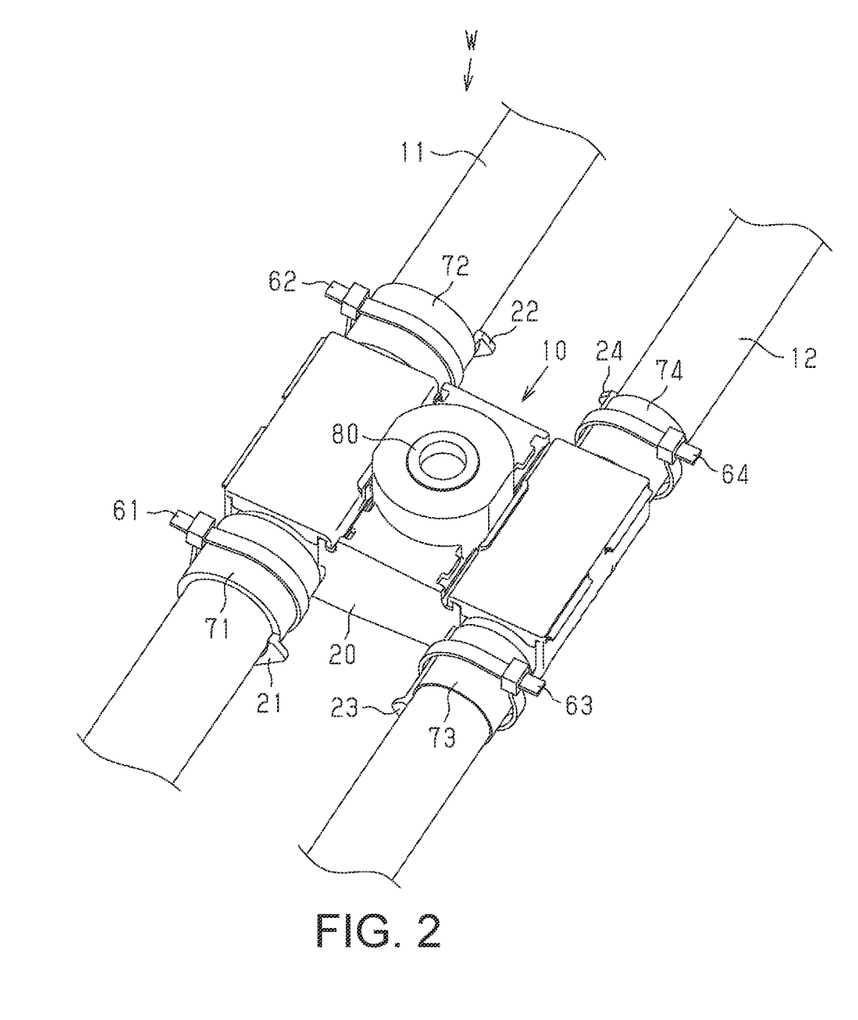
FIG. 2 is a perspective view illustrating a portion of the wire harness that is provided with a clamp.
Figure 5:
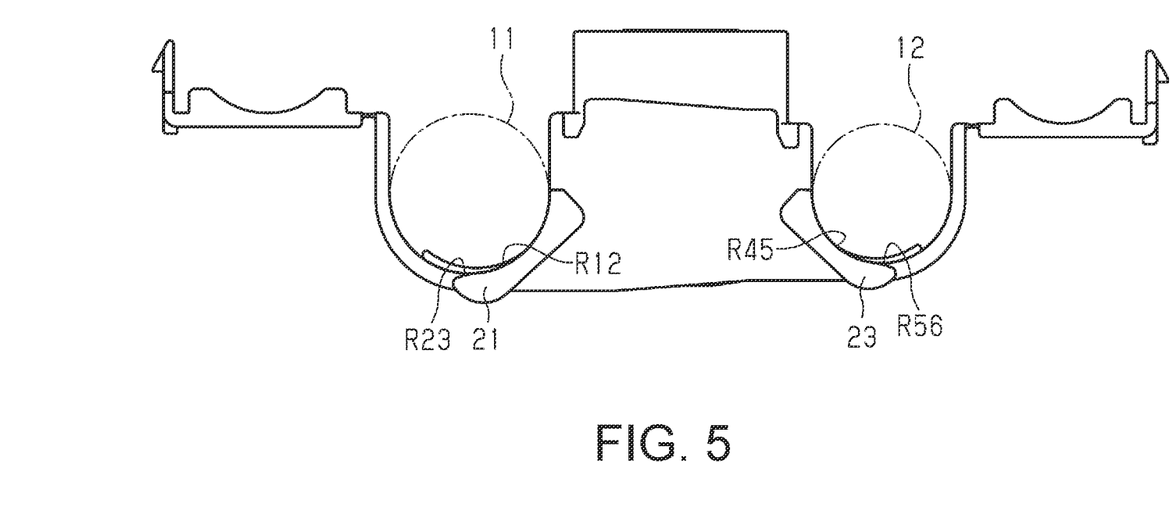
FIG. 5 is a front view illustrating the clamp.
Figure 6:
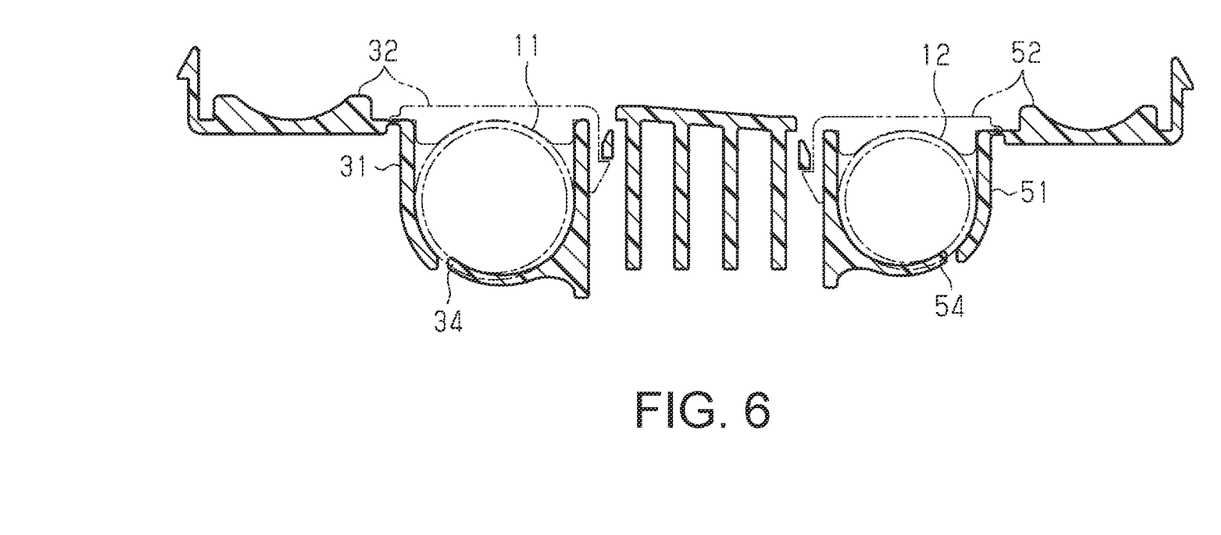
FIG. 6 is a cross-sectional view illustrating the clamp taken along line 6-6 in FIG. 4.

As shown in FIG. 2, the wire harness W includes a high-voltage pipe 11 in which the high-voltage electric wire 1 is housed, a low-voltage pipe 12 in which the low-voltage electric wire 2 is housed, and one or more clamps 10 that hold the pipes 11 and 12. The pipes 11 and 12 are made of a metal, and a metal material such as a copper-based metal material or an aluminum-based metal material can be used. The pipes 11 and 12 serve as shield structures for protecting the electric wires 1 and 2 from flying objects and waterdrops as well as protecting the electric wires 1 and 2 from an electromagnetic wave. As shown in FIGS. 5 and 6, the high-voltage pipe 11 has a larger outer diameter than the low-voltage pipe 12. The reason for this is that, in most cases, the high-voltage electric wire 1 housed in the high-voltage pipe 11 includes a core wire having a large cross-sectional area in order to suppress heat generation when an electric current flows therethrough, and thus the outer diameter of the high-voltage electric wire 1 is likely to be larger than that of the low-voltage electric wire 2. The high-voltage pipe 11 and the low-voltage pipe 12 each correspond to an example of a tubular member (first tube). The wire harness W is routed on and fixed to a predetermined portion or wiring path by attaching the clamp 10 to the pipes 11 and 12 and then fixing the clamp 10 to a fixing target on a vehicle body or the like.

Figure 3:
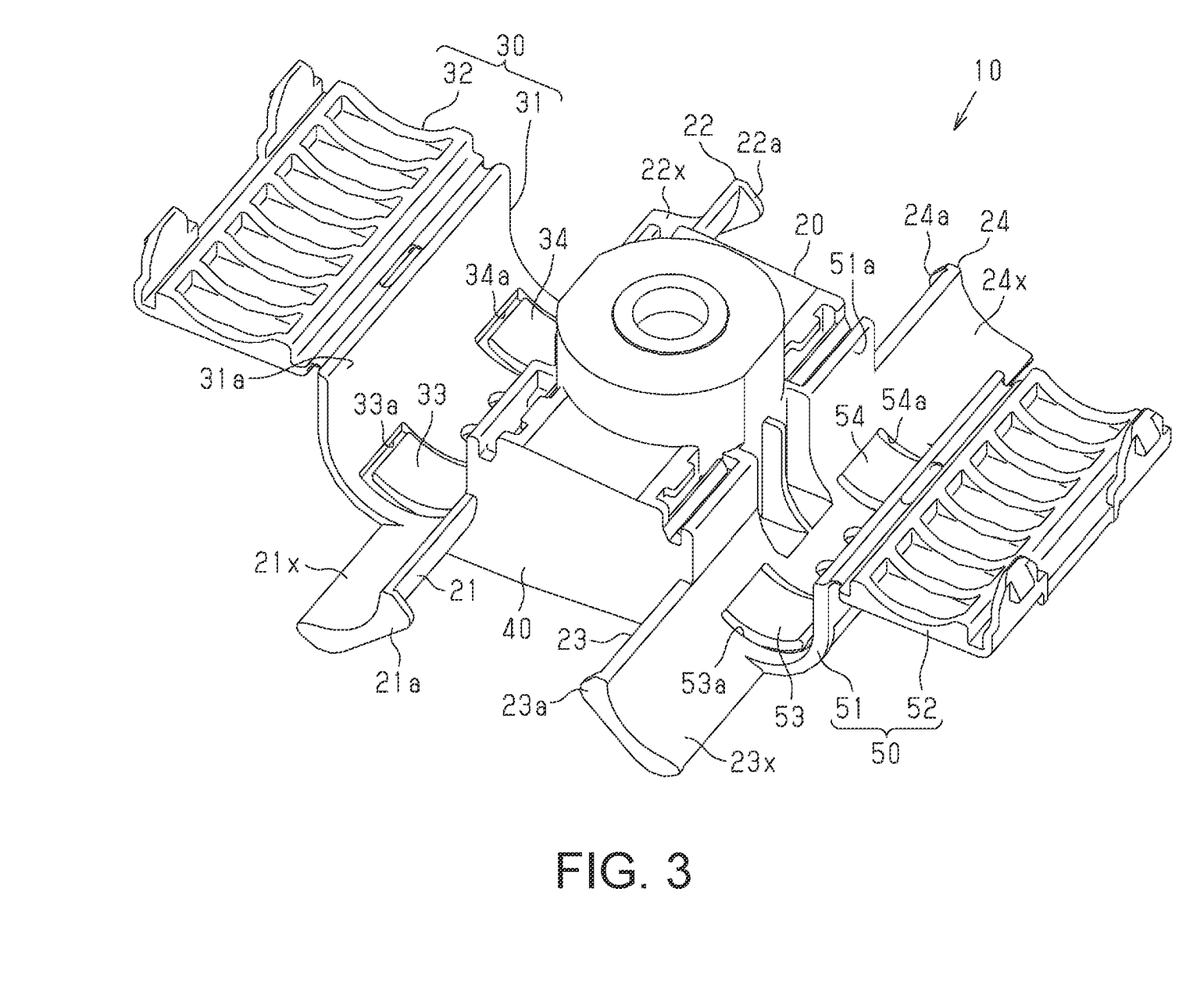
FIG. 3 is a perspective view illustrating the clamp.

As shown in FIG. 3, the clamp 10 includes a main body 20 in which the pipes 11 and 12 are to be housed, protruding portions 21 and 22 (protrusions) that protrude from the main body 20 in the longitudinal direction of the high-voltage pipe 11, and protruding portions 23 and 24 that protrude from the main body 20 in the longitudinal direction of the low-voltage pipe 12. The main body 20 includes a tubular portion 30 (second tube) in which the high-voltage pipe 11 is to be housed, a base portion 40 (base) adjacent to the tubular portion 30, and a tubular portion 50 (second tube) in which the low-voltage pipe 12 is to be housed and that is adjacent to the base portion 40 on a side opposite to the tubular portion 30. The tubular portion 30 includes a housing portion 31 (housing) provided with an opening portion 31a (opening) through which the high-voltage pipe 11 is to be introduced, a lid portion 32 (lid) for covering the opening portion 31a, and stabilizer portions 33 and 34 (stabilizers) for biasing the high-voltage pipe 11 toward the lid portion 32 side. The tubular portion 50 includes a housing portion 51 provided with an opening portion 51a through which the low-voltage pipe 12 is to be introduced, a lid portion 52 for covering the opening portion 51a, and stabilizer portions 53 and 54 for biasing the low-voltage pipe 12 toward the lid portion 52 side.

The stabilizer portions 33 and 34 each include a fixed end and a free end in the circumferential direction of the high-voltage pipe 11, and have a configuration in which the free end side thereof biases the high-voltage pipe 11 toward the lid portion 32 side. The stabilizer portion 33 is provided by forming a U-shaped through hole 33a in the lowermost portion of the housing portion 31. Similarly, the stabilizer portion 34 is provided by forming a U-shaped through hole 34a in the lowermost portion of the housing portion 31. The through holes 33a and 34a are provided so as to be lined up in the longitudinal direction of the high-voltage pipe 11. The inside and the outside of the tubular portion 30 are in communication with each other through the through holes 33a and 34a. The stabilizer portions 33 and 34 elastically hold the high-voltage pipe 11 in collaboration with the lid portion 32. The through holes 33a and 34a function as discharge holes for discharging a liquid such as water or vent holes in the tubular portion 30.

The stabilizer portions 53 and 54 each include a fixed end and a free end in the circumferential direction of the low-voltage pipe 12, and have a configuration in which the free end side thereof biases the low-voltage pipe 12 toward the lid portion 52 side. The stabilizer portion 53 is provided by forming a U-shaped through hole 53a in the lowermost portion of the housing portion 51. Similarly, the stabilizer portion 54 is provided by forming a U-shaped through hole 54a in the lowermost portion of the housing portion 51. The through holes 53a and 54a are provided so as to be lined up in the longitudinal direction of the low-voltage pipe 12. The inside and the outside of the tubular portion 50 are in communication with each other through the through holes 53a and 54a. The stabilizer portions 53 and 54 elastically hold the low-voltage pipe 12 in collaboration with the lid portion 52. The through holes 53a and 54a function as discharge holes for discharging a liquid such as water or vent holes in the tubular portion 50.

The protruding portion 21 protrudes toward one end of the high-voltage pipe 11 in the longitudinal direction from a portion that is located on one end surface of the housing portion 31 in the longitudinal direction and is continuous with the base portion 40. The protruding portion 21 has a surface 21x that is to be opposed to the high-voltage pipe 11. This surface 21x may be a concave curved surface that corresponds to or conforms to the outer circumferential surface of the high-voltage pipe 11, and may also be referred to as an "inner circumferential surface of the protruding portion 21" in the following description. The protruding portion 21 includes a projection 21a on a side opposite to the surface 21x that is to be opposed to the high-voltage pipe 11. The protruding portion 22 protrudes toward the other end of the high-voltage pipe 11 in the longitudinal direction from a portion that is located on the other end surface of the housing portion 31 in the longitudinal direction and is continuous with the base portion 40. The protruding portion 22 has a surface 22x that is to be opposed to the high-voltage pipe 11. This surface 22x may be a concave curved surface that corresponds to or conforms to the outer circumferential surface of the high-voltage pipe 11, and may also be referred to as an "inner circumferential surface of the protruding portion 22" in the following description. The protruding portion 22 includes a projection 22a on a side opposite to the surface 22x that is to be opposed to the high-voltage pipe 11.

The protruding portion 23 protrudes toward one end of the low-voltage pipe 12 in the longitudinal direction from a portion that is located on one end surface of the housing portion 51 in the longitudinal direction and is continuous with the base portion 40. The protruding portion 23 has a surface 23x that is to be opposed to the low-voltage pipe 12. This surface 23x may be a concave curved surface that corresponds to or conforms to the outer circumferential surface of the low-voltage pipe 12, and may also be referred to as an "inner circumferential surface of the protruding portion 23" in the following description. The protruding portion 23 includes a projection 23a on a side opposite to the surface 23x that is to be opposed to the low-voltage pipe 12. The protruding portion 24 protrudes toward the other end of the low-voltage pipe 12 in the longitudinal direction from a portion that is located on the other end surface of the housing portion 51 in the longitudinal direction and is continuous with the base portion 40. The protruding portion 24 has a surface 24x that is to be opposed to the low-voltage pipe 12. This surface 24x may be a concave curved surface that corresponds to or conforms to the outer circumferential surface of the low-voltage pipe 12, and may also be referred to as an "inner circumferential surface of the protruding portion 24" in the following description. The protruding portion 24 includes a projection 24a on a side opposite to the surface 24x that is to be opposed to the low-voltage pipe 12.

Figure 8:
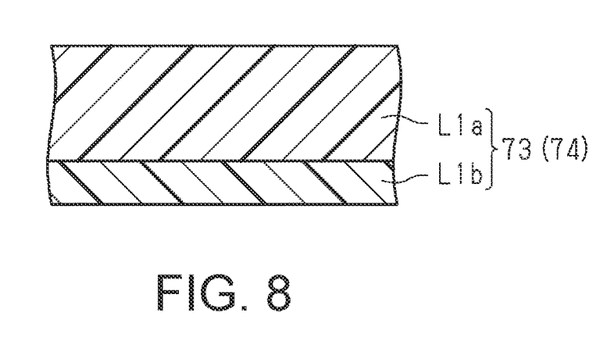
FIG. 8 is a schematic cross-sectional view of a first tape member.

Referring to FIG. 2, the wire harness W includes tape 73 having a surface that is less likely to slide against the protruding portion 23 than the surface of the low-voltage pipe 12, and tape 74 having a surface that is less likely to slide against the protruding portion 24 than the surface of the low-voltage pipe 12. The tapes 73 and 74 are wound onto the outer circumferential surface of the low-voltage pipe 12 such that the sticky layers of the tape 73 and 74 are fixed to the outer circumferential surface of the low-voltage pipe 12, and thus the surface of the tape 73 is in contact with the protruding portion 23 while the surface of the tape 74 is in contact with the protruding portion 24. As shown in FIG. 8, the tape 73 may include a surface layer L1a and a sticky layer L1b. The sticky layer L1b sticks to or adheres to the outer circumferential surface of the low-voltage pipe 12. The surface layer L1a comes into contact with the protruding portion 23. The surface layer L1a may contain polyvinyl chloride as the main component, for example. In the example shown in the diagram, the tape 73 is vinyl tape obtained by integrally providing the sticky layer L1b on one surface of the surface layer L1a. The tape 74 can have the same structure as that of the tape 73, and a surface layer L1a of the tape 74 comes into contact with the protruding portion 24. It should be noted that the tapes 73 and 74 may each include another layer between the surface layer L1a and the sticky layer L1b. Moreover, the wire harness W includes a binding band 63 for pressing the tape 73 against the protruding portion 23, and a binding band 64 for pressing the tape 74 against the protruding portion 24. The tapes 73 and 74 and the binding bands 63 and 64 are used together to fasten the low-voltage pipe 12 to the protruding portions 23 and 24. The tapes 73 and 74 and the binding bands 63 and 64 each correspond to an example of a fastening member (fastener) for fixing the low-voltage pipe 12 to the protruding portions 23 and 24.

Figure 9:
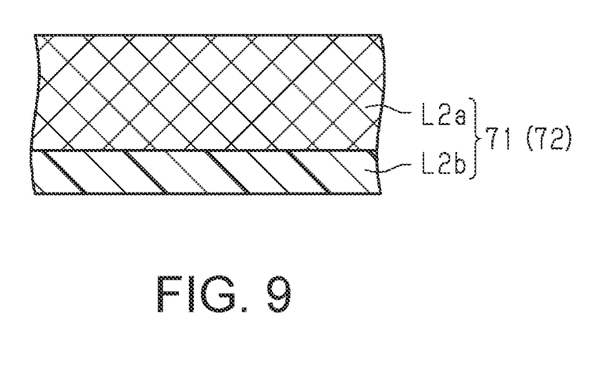
FIG. 9 is a schematic cross-sectional view of a second tape member.

Also, the wire harness W includes tapes 71 and 72 having lower stretchability than the tapes 73 and 74. The tape 71 is wound around the high-voltage pipe 11 and the protruding portion 21 together such that the sticky layer of the tape 71 is fixed thereto, and thus the high-voltage pipe 11 is fixed to the protruding portion 21. Moreover, the tape 72 is wound around the high-voltage pipe 11 and the protruding portion 22 together such that the sticky layer of the tape 72 is fixed thereto, and thus the high-voltage pipe 11 is fixed to the protruding portion 22. As shown in FIG. 9, the tape 71 may include a fabric layer L2a and a sticky layer L2b. The sticky layer L2b sticks to or adheres to the outer circumferential surface of the high-voltage pipe 11 and the outer circumferential surface of the protruding portion 21. The fabric layer L2a may contain acetate fibers as the main component, for example. In the example shown in the diagram, the tape 71 is acetate tape obtained by integrally providing the sticky layer L2b on one surface of the fabric layer L2a, for example. The tape 72 can have the same structure as that of the tape 71, and the sticky layer L2b of the tape 72 sticks to or adheres to the outer circumferential surface of the high-voltage pipe 11 and the outer circumferential surface of the protruding portion 22. The tapes 71 and 72 may each include another layer between the fabric layer L2a and the sticky layer L2b, or another layer on a surface of the fabric layer L2a that is on a side opposite to the sticky layer L2b. The tapes 71 and 72 are not limited to acetate tape, and the fabric layers L2a of the tapes 71 and 72 may be fabric layers that contain other fibers such as polyester-based fibers as the main component, for example. Moreover, the wire harness W includes a binding band 61 with which the tape 71 is fastened, and a binding band 62 with which the tape 72 is fastened. The tapes 71 and 72 and the binding bands 61 and 62 are used together to fasten the high-voltage pipe 11 to the protruding portions 21 and 22. The tapes 71 and 72 and the binding bands 61 and 62 each correspond to an example of a fastening member for fixing the high-voltage pipe 11 to the protruding portions 21 and 22.

Figure 4:
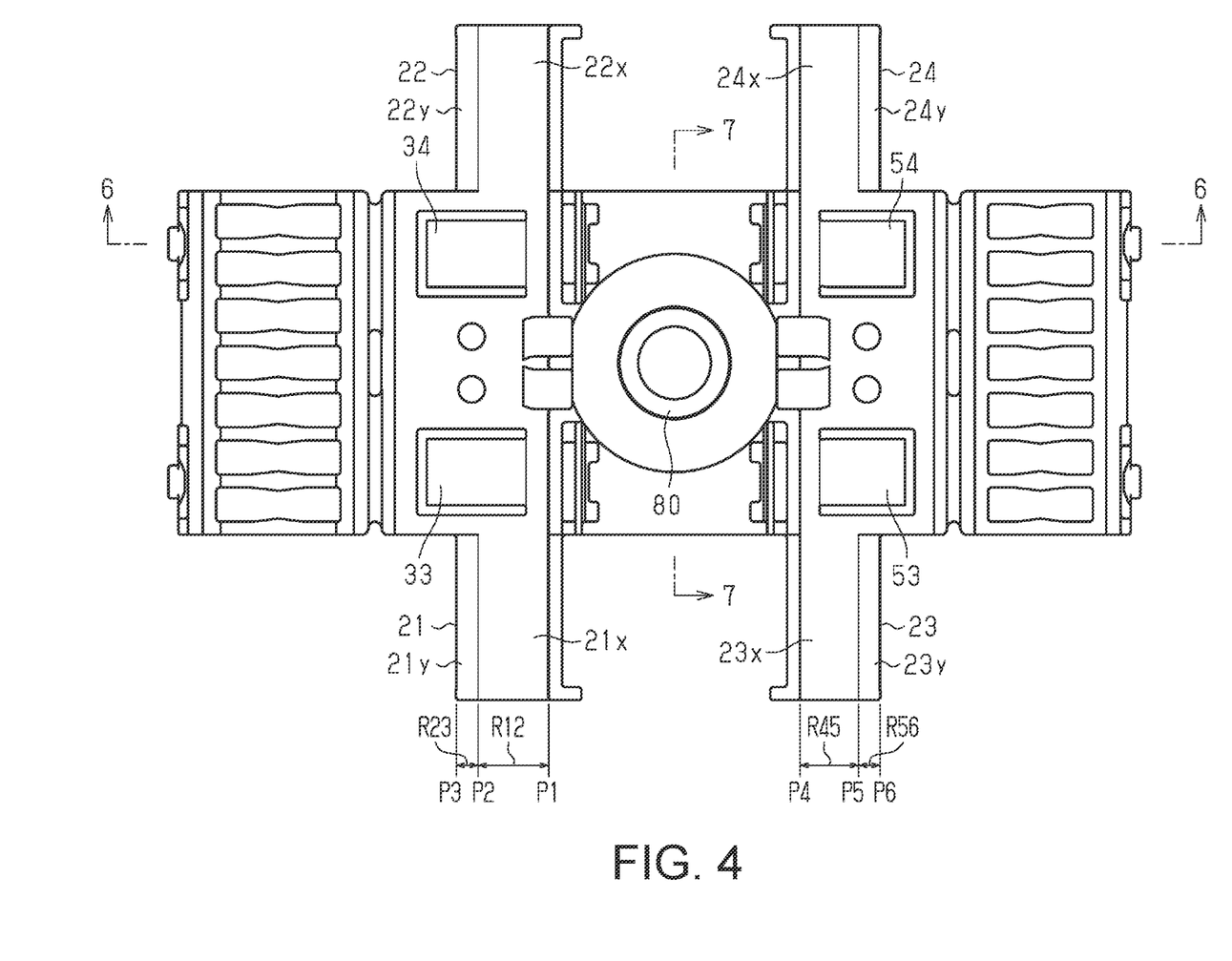
FIG. 4 is a plan view illustrating the clamp.

As shown in FIGS. 4 and 5, the protruding portions 21 and 22 include the inner circumferential surfaces 21x and 22x that are to be opposed to the high-voltage pipe 11, first end portions P1 on one side of the inner circumferential surfaces 21x and 22x in the circumferential direction, and second end portions P3 on the other side thereof in the circumferential direction. The protruding portions 21 and 22 are formed such that the heights of the inner circumferential surfaces 21x and 22x thereof in the vertical direction continuously decrease from the first end portions P1 to the second end portions P3 in the state in which the wire harness W is installed in the vehicle V. The first end portions P1 are each located at about a 3 o'clock position in a front view, and the second end portions P3 are each located at about a half-past-six position, which passes a 6 o'clock position in the clockwise direction, in a front view. Moreover, the inner circumferential surfaces 21x and 22x of the protruding portions 21 and 22 each include, between the first end portion P1 and the second end portion P3, an intermediate position P2 that is opposed to the lowermost portion of the high-voltage pipe 11, in the state in which the wire harness W is installed in the vehicle V. The intermediate position P2 is located at about a 6 o'clock position in a front view.

In each of the inner circumferential surfaces 21x and 22x of the protruding portions 21 and 22, a region R12 between the first end portion P1 and the intermediate position P2 is formed by an ark that corresponds to the outer circumference of the high-voltage pipe 11. On the other hand, in each of the inner circumferential surfaces 21x and 22x of the protruding portions 21 and 22, a region R23 between the intermediate position P2 and the second end portion P3 is formed by a discharge promoting surface 21y or 22y whose height in the vertical direction continuously decreases from the intermediate position P2 to the second end portion P3. The regions R23 that correspond to the discharge promoting surfaces 21y and 22y may each be formed by an inclined surface whose height in the vertical direction decreases linearly, a curved surface whose height in the vertical direction decreases, for example, in a quadratic curve manner, or a combination of inclined surfaces that are inclined at different angles, curved surfaces that have different curvatures, or an inclined surface and a curved surface. Moreover, the region R23 of the protruding portion 21 and the region R23 of the protruding portion 22 may be formed by the discharge promoting surfaces 21y and 22y that are different from each other.

Similarly, the protruding portions 23 and 24 include the inner circumferential surfaces 23x and 24x that are to be opposed to the low-voltage pipe 12, first end portions P4, and second end portions P6. The protruding portions 23 and 24 are formed such that the heights of the inner circumferential surfaces 23x and 24x in the vertical direction continuously decrease from the first end portions P4 to the second end portions P6 in the state in which the wire harness W is installed in the vehicle V. The first end portions P4 are each located at about a 9 o'clock position in a front view, and the second end portions P6 are each located at about a half-past-five position, which is passes a 6 o'clock position in the counterclockwise direction, in a front view. Moreover, the inner circumferential surfaces 23x and 24x of the protruding portions 23 and 24 each include, between the first end portion P4 and the second end portion P6, an intermediate position P5 that is opposed to the lowermost portion of the low-voltage pipe 12, in the state in which the wire harness W is installed in the vehicle V. The intermediate position P5 is located at about a 6 o'clock position in a front view.

In each of the inner circumferential surfaces 23x and 24x of the protruding portions 23 and 24, a region R45 between the first end portion P4 and the intermediate position P5 is formed by an ark that corresponds to the outer circumference of the low-voltage pipe 12. On the other hand, in each of the inner circumferential surfaces 23x and 24x of the protruding portions 23 and 24, a region R56 between the intermediate position P5 and the second end portion P6 is formed by a discharge promoting surface 23y or 24y whose height in the vertical direction continuously decreases from the intermediate position P5 to the second end portion P6. The regions R56 that correspond to the discharge promoting surfaces 23y and 24y each may be formed by an inclined surface whose height in the vertical direction decreases linearly, a curved surface whose height in the vertical direction decreases, for example, in a quadratic curve manner, or a combination of inclined surfaces that are inclined at different angles, curved surfaces that have different curvatures, or an inclined surface and a curved surface. Moreover, the region R56 of the protruding portion 23 and the region R56 of the protruding portion 24 may be formed by the discharge promoting surfaces 23y and 24y that are different from each other.

The following describes an operation for attaching the clamp 10 to the high-voltage pipe 11 and the low-voltage pipe 12.

First, while an attachment jig is used to support the high-voltage pipe 11, a predetermined portion of the high-voltage pipe 11 is introduced into the housing portion 31 through the opening portion 31a in a lateral direction that may be a radial direction intersecting the longitudinal direction of the high-voltage pipe 11. Then, the lid portion 32 is locked to the housing portion 31 using a snap-fit structure, for example. At this time, the stabilizer portions 33 and 34 elastically hold the high-voltage pipe 11 (see FIG. 6). Thereafter, the tape 71 is wound around the high-voltage pipe 11 and the protruding portion 21 together to fix the high-voltage pipe 11 to the protruding portion 21, and in addition, the tape 71 is fastened with the binding band 61. Similarly, the tape 72 is wound around the high-voltage pipe 11 and the protruding portion 22 together to fix the high-voltage pipe 11 to the protruding portion 22, and in addition, the tape 72 is fastened with the binding band 62.

Moreover, the tapes 73 and 74 are wound around and fixed to predetermined portions of the low-voltage pipe 12 in advance. The predetermined portions of the low-voltage pipe 12 around which the tape 73 and the tap 74 are wound may also be referred to as "taping regions". Next, while the predetermined portion around which the tape 73 is wound is brought close to the protruding portion 23 and the predetermined portion around which the tape 74 is wound is brought close to the protruding portion 24, the low-voltage pipe 12 is introduced into the housing portion 51 through the opening portion 51a in a lateral direction that may be a radial direction intersecting the longitudinal direction of the low-voltage pipe 12. Then, the lid portion 52 is locked to the housing portion 51 using a snap-fit structure, for example. At this time, the stabilizer portions 53 and 54 elastically hold the low-voltage pipe 12 (see FIG. 6). Thereafter, the protruding portion 23 and the low-voltage pipe 12 are fastened together with the binding band 63 at the position at which the wound tape 73 is located so as to press the tape 73 against the protruding portion 23. Similarly, the protruding portion 24 and the low-voltage pipe 12 are fastened together with the binding band 64 at the position at which the wound tape 74 is located so as to press the tape 74 against the protruding portion 24.

In this manner, the operation for attaching the clamp 10 to the high-voltage pipe 11 and the low-voltage pipe 12 is completed (see FIG. 2).

Figure 7:
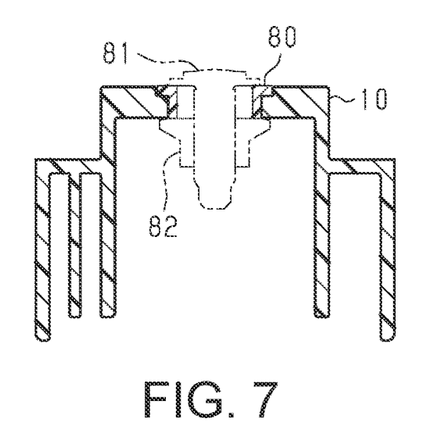
FIG. 7 is a cross-sectional view illustrating the clamp taken along line 7-7 in FIG. 4.

Then, after the completion of the above-mentioned operation, the clamp 10 is fixed to the fixing target on the vehicle body or the like by fastening a bolt 81 and a nut 82 through a collar 80 provided in the clamp 10 as shown in FIG. 7, and thus the wire harness W is installed in the vehicle V. It is conceivable that the pipes 11 and 12 may be exposed to a liquid such as water during subsequent use of the vehicle. However, the protruding portions 21 to 24 are formed such that the heights of the inner circumferential surfaces 21x to 24x thereof in the vertical direction continuously decrease from the first end portions P1 and P4 to the second end portions P3 and P6 in the state in which the wire harness W is installed in the vehicle V. Accordingly, a liquid such as water is favorably discharged along the inner circumferential surfaces 21x to 24x of the protruding portions 21 to 24. Moreover, the through holes 33a, 34a, 53a, and 54a function as discharge holes for discharging a liquid such as water or vent holes, and thus the liquid is discharged from the clamp 10 more efficiently.

As described above, with these embodiments, the following functions and effects can be exhibited.

(1) Due to the configuration in which the heights in the vertical direction of the inner circumferential surfaces 21x to 24x of the protruding portions 21 to 24 of the clamp 10 for holding the high-voltage pipe 11 and the low-voltage pipe 12 continuously decrease from the first end portions P1 and P4 to the second end portions P3 and P6 in the circumferential direction in the state in which the wire harness W is installed in the vehicle V, an effect of suppressing accumulation of a liquid such as water beginning to accumulate in the clamp 10 (mainly in the protruding portions 21 to 24) is obtained. Accordingly, accumulation of a liquid in the clamp 10 can be suppressed. In particular, corrosion and the like of the pipes 11 and 12, which are made of a metal, can be suppressed because the likelihood of the pipes 11 and 12 being exposed to a liquid for a long period of time can be reduced.

(2) Discharge of a liquid such as water beginning to accumulate in the clamp 10 (mainly in the tubular portions 30 and 50) and ventilation can occur through the through holes 33a, 34a, 53a, and 54a through which the inside and the outside of the tubular portions 30 and 50 are in communication with each other.

(3) The likelihood of a liquid such as water beginning to accumulate in the clamp 10 (mainly in the tubular portions 30 and 50) being discharged is increased by providing a plurality of through holes 33a, 34a, 53a, and 54a in the tubular portions 30 and 50. Moreover, with such a configuration, the plurality of through holes 33a and 34a and the plurality of through holes 53a and 54a can also function in pairs to allow ventilation while the liquid such as water is being discharged therethrough, thus making it possible to promote the discharge of the liquid.

(4) The U-shaped through holes 33a, 34a, 53a, and 54a for forming the stabilizer portions 33 and 53 can also function as discharge holes for discharging a liquid beginning to accumulate in the clamp 10 (mainly in the tubular portions 30 and 50) or vent holes.

(5) Since the regions R23 and R56, which correspond to the discharge promoting surfaces 21y to 24y, are provided on the inner circumferential surfaces 21x to 24x of the protruding portions 21 to 24, accumulation of a liquid such as water near the intermediate positions P2 and P5 is suppressed. Accordingly, a liquid on the inner circumferential surfaces 21x to 24x can be more reliably discharged.

It should be noted that the embodiments mentioned above can be implemented with various modifications as follows. The embodiments mentioned above and the following modified examples can be used in combination with each other as long as they are technically compatible with each other.

The wire harness W may include a clamp 10 for holding one tubular member (e.g., high-voltage pipe 11) or three or more tubular members.

The fastening member is not limited to a tape member (e.g., tapes 71 to 74) and a band member (e.g., binding bands 61 to 64), and may be only one of these or another member.

One of the protruding portions 21 and 22 may be omitted, and one of the protruding portions 23 and 24 may be omitted.

One of the stabilizer portions 33 and 34 may be omitted, and one of the stabilizer portions 53 and 54 may be omitted. For example, a single stabilizer portion may be provided at the center of each of the tubular portions 30 and 50 in the longitudinal direction.

One or more liquid discharge grooves may be formed between the first end portions P1 and P4 to the corresponding second end portions P3 and P6 in order to keep the flow of a liquid such as water from being inhibited by the pipes 11 and 12.

There is no limitation to the configuration in which the inner circumferential surfaces 21x to 24x of the protruding portions 21 to 24 are each formed by only a curved surface, and the inner circumferential surfaces 21x to 24x may each be formed by only a flat surface or by a combination of a flat surface and a curved surface. However, the protruding portions 21 to 24 are formed such that the heights of the inner circumferential surfaces 21x to 24x in the vertical direction continuously decrease from the first end portions P1 and P4 to the second end portions P3 and P6 in the state in which the wire harness W is installed in the vehicle V.

There is no limitation to the configuration in which the through holes 33a, 34a, 53a, and 54a are provided in the lowermost portions of the housing portions 31 and 51, and the through holes 33a, 34a, 53a, and 54a may be provided at other positions as long as the inside and the outside of the tubular portions 30 and 50 are in communication with each other therethrough. When the through holes 33a, 34a, 53a, and 54a are provided in the lowermost portions of the housing portions 31 and 51, the through holes 33a, 34a, 53a, and 54a can function as discharge holes for discharging a liquid or vent holes. In other words, even if the through holes 33a, 34a, 53a, and 54a are provided at positions higher than the lowermost portions of the housing portions 31 and 51 in the vertical direction, the through holes 33a, 34a, 53a, and 54a can function as vent holes.

It is preferable that the tubular portion 30 is provided with two through holes 33a and 34a from the viewpoint of promoting discharge of a liquid or ventilation, but one of the through holes 33a and 34a may be omitted. Similarly, one of the through holes 53a and 54a may be omitted.

If a liquid is satisfactorily discharged from the wire harness W due to the protruding portions 21 to 24, the through holes 33*a*, 34*a*, 53*a*, and 54*a* may be omitted. However, when the U-shaped through holes 33*a*, 34*a*, 53*a*, and 54*a* are formed to provide the stabilizer portions 33, 34, 53, and 54, the through holes 33*a*, 34*a*, 53*a*, and 54*a* may be provided.

The inner circumferential surfaces 21*x* and 22*x* of the protruding portions 21 and 22 each need not be necessarily configured such that the first end portion P1 is located at about a 3 o'clock position in a front view, and the second end portion P3 is located at about a half-past-six position in a front view. Moreover, the inner circumferential surfaces 23*x* and 24*x* of the protruding portions 23 and 24 each need not be necessarily configured such that the first end portion P4 is located at about a 9 o'clock position in a front view, and the second end portion P6 is located at about a half-past-five position in a front view. For example, the protruding portions 21 to 24 may be formed such that the heights of the inner circumferential surfaces 21*x* to 24*x* thereof in the vertical direction continuously decrease in a counterclockwise direction from a short-hand position at quarter to eleven in a front view (that corresponds to an example of the first end portion) to a short-hand position at quarter past seven in a front view (that corresponds to an example of the second end portion).

The pipes 11 and 12 can each include a linear portion and may also include a bent portion. The pipes 11 and 12 are typically cylinders, and may be non-cylinders such as elliptical tubes. The clamp 10 is configured to be attached to the linear portions of the pipes 11 and 12, bridge the linear portion of the pipe 11 and the linear portion of the pipe 12, and hold the linear portion of the pipe 11 and the linear portion of the pipe 12 such that these portions are spaced apart from each other at a predetermined interval. In the example shown in the diagram, the clamp 10 is configured to keep the linear portion of the pipe 11 and the linear portion of the pipe 12 substantially parallel with each other. A configuration can be employed in which the clamp 10, the linear portion of the pipe 11, and the linear portion of the pipe 12 are arranged or extend in the same plane, for example. The clamp 10 can be advantageously used to form a low-profile wire harness W that includes a plurality of pipes by reducing the thickness thereof, for example.

The housing portions 31 and 51 of the clamp 10 may each have a concave curved surface that corresponds to or conforms to the outer circumferential surface of the corresponding pipe 11 or 12.

The protruding portion 23 of the clamp 10 may be a tongue-shaped projection having a concave curved surface that corresponds to or conforms to the outer circumferential surface of the corresponding pipe 12. The protruding portion 23 may have a convex curved surface on a side opposite to the concave curved surface. The same applies to the other protruding portions 21, 22, and 24.

The discharge promoting surface 21*y* of the protruding portion 21 of the clamp 10 can be configured as a chamfered edge provided near the second end portion P3 of the protruding portion 21. In general, a liquid on the inner circumferential surface 21*x* of the protruding portion 21 may accumulate near the second end portion P3 of the inner circumferential surface 21*x* due to the surface tension of the liquid. In this respect, a liquid does not accumulate near the second end portion P3 due to the discharge promoting surface 21*y*, which is a chamfered edge provided near the second end portion P3. The flow of a liquid tends to further progress on the discharge promoting surface 21*y* under the liquid's own weight, the liquid smoothly moves to the lower surface, which is the convex curved surface, of the protruding portion 21 over the second end portion P3 of the protruding portion 21, and then the liquid streams down or drips down from the second end portion P3 of the protruding portion 21 or the lower surface thereof and is thus discharged. In this manner, the discharge promoting surface 21*y* prevents or reduces the accumulation of a liquid caused by surface tension near the second end portion P3 of the inner circumferential surface 21*x* of the protruding portion 21. The same applies to the other discharge promoting surfaces 22*y* to 24*y*.

The projection 23*a* may also be referred to as a fastening member stopper that is configured to suppress detachment of the binding band 63 from the protruding portion 23. The same applies to the projection 24*a*.

The projection 21*a* may also be referred to as a tape stopper that is configured to suppress displacement of the tape 71 relative to the protruding portion 21, or suppress partial or overall detachment of the tape 71 from the protruding portion 21. The same applies to the projection 22*a*.

The stabilizer portion 33 can be configured to elastically support the corresponding pipe 11 from below, for example. The stabilizer portion 33 advantageously absorbs vibration of the pipe 11 caused by vehicle travel, for example. The stabilizer portion 33 can be configured as a cantilever-like damper that is formed as a single body with the tubular portion 30 of the clamp 10. The same applies to the stabilizer portion 34 of the tubular portion 30, and the stabilizer portions 53 and 54 of the tubular portion 50.

In the example shown in FIG. 6, the clamp 10 can be configured as a single product made of a synthetic resin. The clamp 10 may be configured as an assembly of a plurality of parts.

The present disclosure encompasses the following implementation examples. Reference numerals of constituent elements of the embodiments have been added not to limit the disclosure, but to assist comprehension.

Supplementary Note 1: A wire harness according to one or more implementation examples of the present disclosure can include:

an electric wire (1);

a tubular member (11) that has an outer circumferential surface and a linear portion and in which the electric wire (1) is housed; and a clamp (10) that holds the linear portion of the tubular member (11), wherein the clamp (10) has an attachment surface (80) configured to be attached to the vehicle and fixed thereto, the clamp (10) can have concave curved surfaces (31*a*, 51*a*, 21*x*, 22*x*, 23*x*, and 24*x*) that correspond to or conform to the outer circumferential surface of the tubular member (11), predetermined positions (33*a*, 34*a*, P3, and p6) of the concave curved surfaces (31*a*, 51*a*, 21*x*, 22*x*, 23*x*, and 24*x*) are arranged at the lowermost positions of the concave curved surfaces (31*a*, 51*a*, 21*x*, 22*x*, 23*x*, and 24*x*) in the vertical direction in the state in which the clamp (10) is attached to the vehicle, and the clamp (10) can be provided with water discharge promoting structures (33*a*, 34*a*, 21*y*, 22*y*, 23*y*, and 24*y*) configured to promote discharge of water from the concave curved surfaces (31*a*, 51*a*, 21*x*, 22*x*, 23*x*, and 24*x*), at the predetermined positions (33*a*, 34*a*, P3, and p6) of the concave curved surfaces (31*a*, 51*a*, 21*x*, 22*x*, 23*x*, and 24*x*).

Supplementary Note 2: The clamp (10) can include tongue-shaped projections (21, 22, 23, and 24) that protrude in a longitudinal direction of the tubular member (11), and the tongue-shaped projections (21, 22, 23, and 24) can have the concave curved surfaces (21*x*, 22*x*, 23*x*, and 24*x*) that conform to the outer circumferential surfaces of the tubular members (11 and 12), and the water discharge promoting structures (33*a*, 34*a*, 21*y*, 22*y*, 23*y*, and 24*y*) can include chamfered edges (21*y*, 22*y*, 23*y*, and 24*y*) provided near the edges of the concave curved surfaces (21*x*, 22*x*, 23*x*, and 24*x*) of the tongue-shaped projections (21, 22, 23, 24).

Supplementary Note 3: The clamp (10) can include housing portions (31 and 51) configured to be attachable to the tubular members (11 and 12) in a lateral direction intersecting the longitudinal direction of the tubular members (11 and 12), the housing portions (31 and 51) can have concave curved surfaces that conform to the outer circumferential surfaces of the tubular members (11 and 12), the water discharge promoting structures (33*a*, 34*a*, 21*y*, 22*y*, 23*y*, and 24*y*) are provided on the concave curved surfaces of the housing portions (31 and 51) and can include slit-like water discharge holes (33*a* and 34*a*) that pass through the lowermost portions of the concave curved surfaces in the vertical direction, and the clamp (10) can include cantilever-like dampers (33 and 34) configured to elastically press the outer circumferential surfaces of the tubular members (11 and 12), and the slit-like water discharge holes (33*a* and 34*a*) that pass through the concave curved surfaces of the housing portions (31 and 51) can delimit the cantilever-like dampers (33 and 34) at the lowermost positions of the housing portions (31 and 51) in the vertical direction.

The invention claimed is:

1. A wire harness to be installed in a vehicle, comprising:
    an electric wire;
    a first tube in which the electric wire is housed; and
    a clamp that holds the first tube, wherein:
        the clamp includes a main body in which the first tube is housed, and a protrusion that protrudes from the main body in a longitudinal direction of the first tube, the first tube being fastened to the protrusion with a fastener,
        the protrusion has an inner circumferential surface opposed to the first tube, a first end located on one side of the inner circumferential surface in a circumferential direction, and a second end located on an other side of the inner circumferential surface in the circumferential direction, a height of the inner circumferential surface in a vertical direction continuously decreasing from the first end to the second end in a state in which the wire harness is installed in the vehicle,
    the main body includes a second tube in which the first tube is housed, and a base that is adjacent to the second tube,
    the second tube is provided with a through hole through which an inside and an outside of the second tube are in communication with each other,
    the second tube includes a housing provided with an opening through which the first tube is introduced, a lid that covers the opening, and a stabilizer for biasing the first tube toward the lid, and
    the stabilizer is provided by forming the through hole in a U-shape.

2. The wire harness according to claim 1, wherein the through hole is a plurality of through holes and the second tube is provided with the plurality of through holes.

3. The wire harness according to claim 1, wherein the inner circumferential surface includes an intermediate position opposed to a lowermost portion of the first tube between the first end and the second end, and further includes a discharge promoting surface whose height in the vertical direction continuously decreases from the intermediate position to the second end, in a state in which the wire harness is installed in the vehicle.

* * * * *